United States Patent [19]

Otto

[11] Patent Number: 5,706,431
[45] Date of Patent: Jan. 6, 1998

[54] SYSTEM AND METHOD FOR DISTRIBUTIVELY PROPAGATING REVISIONS THROUGH A COMMUNICATIONS NETWORK

[75] Inventor: George V. E. Otto, Gillette, N.J.

[73] Assignee: AT&T, Middletown, N.J.

[21] Appl. No.: 581,683

[22] Filed: Dec. 29, 1995

[51] Int. Cl.$^6$ .................................................. G06F 13/00
[52] U.S. Cl. ..................... 395/200.03; 395/619; 395/670
[58] Field of Search ..................... 395/200.02, 200.05, 395/200.06, 200.03, 200.09, 200.12, 200.13, 187.01, 500, 620, 619

[56] References Cited

U.S. PATENT DOCUMENTS

| | | | |
|---|---|---|---|
| 4,714,992 | 12/1987 | Gladney et al. | 395/622 |
| 4,788,637 | 11/1988 | Tamaru | 395/200.01 |
| 4,875,208 | 10/1989 | Furuhashi et al. | 370/400 |
| 4,908,828 | 3/1990 | Tikalsky | 371/69.1 |
| 5,008,814 | 4/1991 | Mathur | 395/200.01 |
| 5,212,789 | 5/1993 | Rago | 395/608 |
| 5,261,094 | 11/1993 | Everson et al. | 395/617 |
| 5,307,487 | 4/1994 | Tavares et al. | 395/608 |
| 5,450,606 | 9/1995 | Shiga et al. | 395/712 |
| 5,459,862 | 10/1995 | Garliepp et al. | 395/608 |
| 5,469,562 | 11/1995 | Saether | 395/182.18 |
| 5,473,772 | 12/1995 | Halliwell et al. | 395/712 |
| 5,602,993 | 2/1997 | Stromberg | 395/200.1 |

FOREIGN PATENT DOCUMENTS 0481457  4/1992  European Pat. Off. .

Primary Examiner—Parshotam S. Lall
Assistant Examiner—Viet Vu
Attorney, Agent, or Firm—Jeffrey Weinick

[57] ABSTRACT

A system, and method of operation, for propagating revisions through a communications network. The system includes: (1) status reporting circuitry, associated with a second node of the communications network, for collecting and transmitting a current status of second node information stored in a memory of the second node, (2) first information revising circuitry, associated with a first node of the communications network, for receiving the current status from the second node, determining as a function of the current status whether a revision of the second node information is required and, if the revision is required, transmitting the revision to the second node to revise the second node information and (3) second information revising circuitry, associated with the second node of the communications network, for receiving a current status from a third node of the communications network, determining as a function of the current status from the third node whether a revision of third node information stored in a memory of the third node is required and, if the revision is required, transmitting the revision received from the first node to the third node to revise the third node information, the revision thereby propagating through the communications network via the first, second and third nodes thereof.

21 Claims, 3 Drawing Sheets

1

SYSTEM AND METHOD FOR DISTRIBUTIVELY PROPAGATING REVISIONS THROUGH A COMMUNICATIONS NETWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

The present invention is directed, in general, to communications networks and, more specifically, to a system and method for distributing updates to nodes of a hierarchical communications network that cascade the updates through the network as a function of its hierarchy.

BACKGROUND OF THE INVENTION

Immeasurable gains in technology offered in personal computers ("PCs") have allowed PCs to assume roles performed only by mainframe or minicomputers in the past. Many companies and, for that matter, individual users rely largely on commercially-available PCs to meet their information processing needs. Thus, it is vital that their PCs perform reliably. The fault tolerance of a given computer system is a sensitive issue with companies and individual users given the level of reliance they place on their computing systems.

Initially PCs were stand-alone devices, each containing separate hardware, operating system, application software and user data. As use of PCs spread within business organizations, however, the need for shared data and hardware resources grew, and local area network ("LANs") came into being. A LAN (or its more-geographically-dispersed counterpart, the wide area network ("WAN")) includes a number of PCs ("clients") linked to one another (typically by a high speed serial communications link) and centers around a relatively high performance PC or minicomputer ("server") that delivers programs and data to the clients and manages system-wide resources, such as secondary storage units and printers.

The networking concept has proven very useful, but suffers from a couple of disadvantages. First, since management of the network is focussed in the server, the overall performance of the network is compromised whenever the server becomes a processing bottleneck. Second, since programs and data are delivered by the server to its various clients, a distribution problem occurs whenever a software provider or vendor modifies one of its programs or data. The modified program or data must typically be distributed from the server to the client computers in a timely manner, often within a single business day. In a prior art solution, the server, or a "host" computer identified by the server, is responsible for sequentially traversing each of the client computers supporting an "old" version of the modified program or data, and then updating those client computers as necessary to implement the "new" version. In an alternate prior art solution, the server, or the host computer, traverses each client computer, updating each to include certain ones of the server's files.

A problem inherent to the prior art solutions is that substantial server, or host, processing resources may be spent establishing a communication link with many, if not all, of the client computers, and then updating the same. Further, if the server is responsible for performing the updates and the number of client computers being serviced by the server increases, the overall performance of the network may significantly be compromised as the server becomes a processing bottleneck. A system and method are needed for propagating revisions to programs or data through a communications network wherein the communications network, and in particular the server's resources, are neither compromised nor wasted. The inability of conventional solutions to accomplish the foregoing remains a dominant obstacle to updating software products distributed among various ones of the client computers of a communications network.

SUMMARY OF THE INVENTION

To address the above-discussed deficiencies of the prior art, the present invention provides a system, and method of operation, for propagating revisions through a communications network, wherein the communications network includes a plurality of associated nodes.

The system includes: (1) status reporting circuitry, associated with a second node of the communications network, for collecting and transmitting a current status of second node information stored in a memory of the second node, (2) first information revising circuitry, associated with a first node of the communications network, for receiving the current status from the second node, determining as a function of the current status whether a revision of the second node information is required and, if the revision is required, transmitting the revision to the second node to revise the second node information and (3) second information revising circuitry, associated with the second node of the communications network, for receiving a current status from a third node of the communications network, determining as a function of the current status from the third node whether a revision of third node information stored in a memory of the third node is required and, if the revision is required, transmitting the revision received from the first node to the third node to revise the third node information, the revision thereby propagating through the communications network via the first, second and third nodes thereof.

The present invention therefore allows revisions to propagate automatically through a communications network. Nodes in the network are responsible for both detecting when a revision to information in another node is necessary and transmitting the revision to the other node. "Information," as used the term is used herein, is defined broadly to encompass both instructions (e.g., programs, functions, tasks, subroutines, procedures and the like) and data. The "information" subject to revision by the present invention may, for example, be a computer program (allowing automatic distribution of program updates, fixes, tools and the like), computer data (e.g., documents, spreadsheets, databases, data files and the like), video data or the like.

In one embodiment of the present invention, at least the second information revising circuitry includes memory for storing a subscriber list, wherein the second information revising circuitry transmits the above-described revision as a function of the content of the subscriber list. The present invention is therefore able to form the core of a fee-based update service, wherein subscribers pay for revisions. The amount of information revised and the frequency of the revisions may be selectable, allowing a range of fee-based services to be offered. In a related embodiment, the subscriber list and the current status are suitably processed to identify a subset of the information of the subscriber list that is available to a particular user or group of users, the processing therefore functioning as a filter for the subscriber list.

In one embodiment of the present invention, the status reporting circuitry collects and transmits the current status of the second node information to the first node at a first time, status information circuitry associated with the third node collecting and transmitting the current status from the third node to the second node at a second time, the second time subsequent to the first time by a period of time sufficient to allow the second node information to be fully revised before the second information revising circuitry transmits the revision to the third node. This allows orderly "waves" of revisions to propagate through the network. Alternatively, revisions may be distributed in a more random fashion, as one node determines that another requires a revision.

In one embodiment of the present invention, the second information revising circuitry is embodied in a sequence of instructions operable on a second processor associated with the second node, the revision capable of including revisions to the sequence of instructions, thereby allowing an operation of the second information revising circuitry to be modified or altered. The information revising circuitry itself may therefore be allowed to change or be updated.

The communications network is hierarchical, in one embodiment of the present invention, the first node functions as a server for the second node, the second node functions as a server for the third node. "Hierarchical", as the term is used herein, means a structure of many levels wherein particular levels have control or precedence over other levels (e.g., higher precedence levels over lower precedence levels), and wherein a first level node may be hierarchically related to one or more second level nodes, each second level node may be hierarchically related to one or more third level nodes, each third level node may be hierarchically related to one or more fourth level nodes, etc. Precedence may suitably be based upon order (e.g. sequentially), responsibility, functionality, etc. The broad scope of the present invention therefore encompasses tree-based networks, as well as flat, peer-to-peer networks. The present invention is furthermore not limited to computer networks, such as LANs or WANs, but rather is operable in telecommunication systems to update system software or data or in wireless environments, such as cellular telephony or message paging networks.

In one embodiment of the present invention, the first information revising circuitry includes first security circuitry for authenticating the current status received from the second node before the first node transmits the revision to the second node and the second node includes second security circuitry for authenticating the revision received from the first node before revising the second node information. In a related embodiment, the second security circuitry authenticates the revision on a file-by-file basis. Of course, the security circuitry may be in the form of computer instructions, allowing the circuitry to change or be updated over time.

In one embodiment of the present invention, the first information revising circuitry revises the second node information by logging onto the second node and transmitting a sequence of commands to the second node to enable the second node to receive the revision. The present invention therefore operates in a conventional network environment and may therefore be completely transparent to the underlying network operating system ("NOS"). Security and other features of the NOS may therefore remain intact.

An advantageous embodiment for using and/or distributing the present invention is as software. The software embodiment includes a plurality of instructions which are stored to a suitable conventional memory or other equivalent storage medium. The instructions are readable and executable by one or more network nodes having processing circuitry. The instructions, upon execution, direct the processing circuitry to propagate revisions through a communications network wherein the communications network includes a plurality of associated nodes in accordance with the present invention. Exemplary memory and storage media include without limitation magnetic, optical, and semiconductor, as well as suitably arranged combinations thereof.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which like numbers designate like parts, and in which.

DETAILED DESCRIPTION

Figure 1:
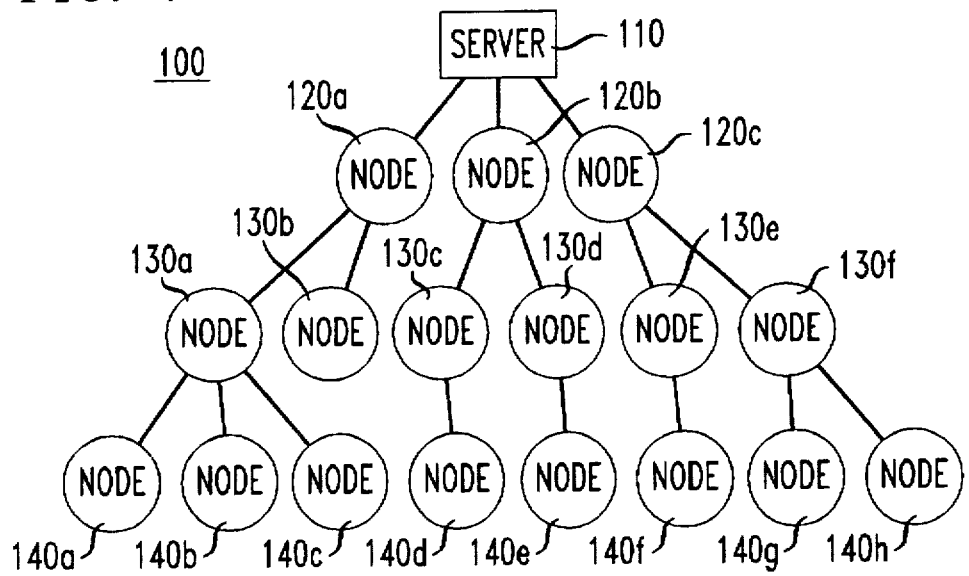
FIG. 1 illustrates a block diagram of a conventional hierarchical communications network in which the principles of the present invention may advantageously be implemented.

Referring initially to FIG. 1, illustrated is a block diagram of a conventional hierarchical communications network, a computer network (generally designated 100), in which the principles of the present invention may advantageously be implemented. Exemplary network 100 includes a server node 110 and a plurality of conventional client nodes 120a–120c, 130a–130f and 140a–140h. "Include," as the term is used herein, is defined as inclusion without limitation. A "node," as the term is used herein, is defined as any junction, end or connection point, station, terminal or the like, whether portable or not, that is capable of communicating signals, or information, within communications network 100.

Server node 110 may suitably and conventionally be sharable by client nodes 120a–120c, 130a–130f and 140a–140h. Server node 110 and client nodes 120a–120c, 130a–130f and 140a–140h may suitably be associated with one another, either directly or indirectly, by any conventional means, including communication links, portal devices (e.g., routers, bridges, gateways, switches, etc.) or the like. "Associated with," as the term is used herein, means to include within, interconnect with, contain, be contained within, connect to, couple with, be communicable with, juxtapose, cooperate with, interleave or the like. "Or," as the term is used herein, is inclusive, meaning and/or.

The illustrated association of nodes 110, 120a–120c, 130a–130f and 140a–140h suitably facilitates resource sharing as well as the balancing of resource requests among ones of the nodes, techniques that are known in the art. Communication among various ones of the nodes may suitably include the transmission and reception of signals. Each communication signal may suitably be divided into packets, frames, messages, sequences of data or any other variation of a physical quantity for conveying information. A typical signal may suitably include a collection of related data items, such as discrete data, address or instruction objects that may be used to communicate information between various ones of the nodes.

In an advantageous embodiment, as will be discussed in greater detail with reference to FIGS. 4 and 5, revisions to at least a portion of the information stored on server 110 may suitably be propagated on a level-by-level basis through communications network 100 in accordance with the principles of the present invention. "Revisions," as the term is used herein, means changes, modifications, additions, deletions, adjustments, alterations, variations, customizations, and the like. More particularly, at least one of the second level nodes 120a–120c collects and transmits a second level current status of information stored in the one or more second level nodes. The second level current status of information may suitably be for the entire level or for individual ones of second level nodes 120a–120c. Server 110, a first level node, receives the second level current status of information and determines, as a function of the second level current status of information, whether a revision of one or more of the second level nodes' information is required. If the revision is required, server 110 transmits the revision of the second level node information to the one or more second level nodes 120a–120c.

After the revision, the one or more second level nodes 120a–120c may suitably receive a third level current status of information from at least one third level node 130a–130f, and determine, as a function of the third level current status of information, whether a revision of the one or more third level nodes' information is required. The third level current status of information may similarly be for the entire level or for individual ones of third level nodes 130a–130f. If the third level revision is required, the one or more second level nodes 120a–120c transmit at least part of the revision received from server 110 to the one or more third level nodes 130a–130f to thereby revise the third level node information.

An important aspect of the above-identified and -described embodiment is the breadth-first-type, or "fan-out," update. More particularly, revisions to the first level node information are suitably propagated through ones of the second level nodes, then the third level nodes, and so on, such that the revisions to the first level node information may be propagated through communications network 100 in an exponential manner.

Figure 2:
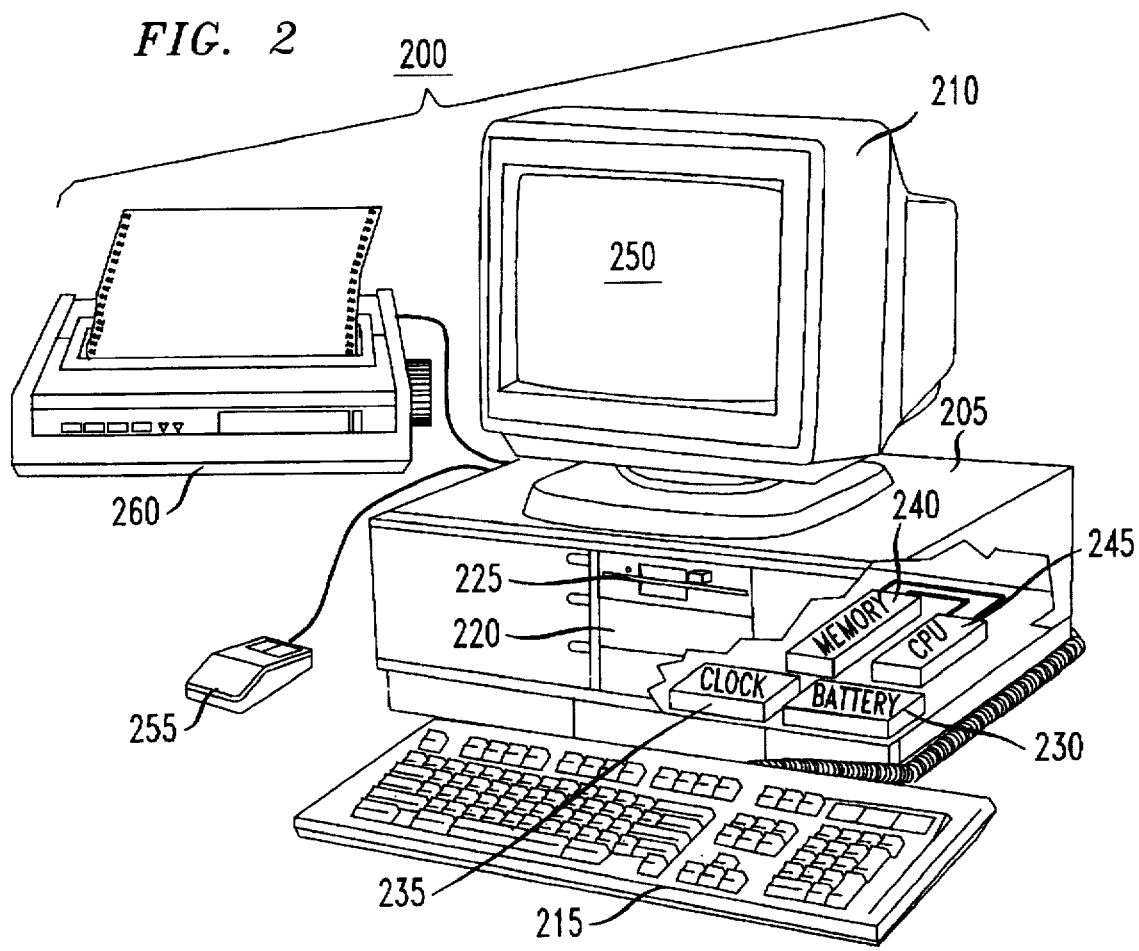
FIG. 2 illustrates an isometric view of an exemplary processing system node that provides a suitable environment within which the present invention may be implemented and operated in accordance with the communications network of FIG. 1.

Turning to FIG. 2, illustrated is an isometric view of an exemplary processing system, a PC (generally designated 200). Processing system 200 is capable of functioning as any node 110, 120a–120c, 130a–130f and 140a–140h within exemplary communications network 100. Processing system 200 suitably includes a chassis 205, a display device 210 and a keyboard 215. Chassis 205 includes a hard disk drive 220 and a floppy disk drive 225. Floppy disk drive 225 may suitably be replaced by or combined with other conventional structures for transferring data or instructions, including tape and compact disc drives, telephony systems and devices (including telephone, video phone, facsimile or the like), network communication ports and the like.

Chassis 205 is partially cut-away to illustrate a battery 230, a clock 235, a detached local memory 240 and processing circuitry 245 ("CPU"), all of which are suitably housed therein. Detached local memory 240 is operative to store data and instructions. The stored instructions may suitably be grouped into sets of tasks, including programs, procedures, subroutines, functions, and the like. Processing circuitry 245, which is associated with detached local memory 240, is operative to execute selected ones of the instructions stored therein to propagate revisions to the stored data and instructions through communications network 100 in accordance with the principles of the present invention.

In an advantageous embodiment, display device 210 is operative to provide a display area 250 that is accessible to executed ones of the plurality of instructions, and that is capable of displaying a graphical user tolerance. Further coupled through individual conventional connectors (not shown) on chassis 205 are a mouse 255 and a printer 260. Exemplary peripheral devices 210, 215, 255 and 260, all of which are associated with processing circuitry 245, allow processing system 200 to interact with a user. Exemplary peripheral devices 210, 215, 255 and 260 may suitably be replaced by or combined with other conventional user interfaces.

Although processing system 200 is illustrated having a single processor, a single hard disk drive and a single local memory, processing system 200 may suitably be equipped with any multitude or combination of processors or storage devices. Processing system 200 may, in point of fact, be replaced by, or combined with, any suitable node operative in accordance with the principles of the present invention, including sophisticated calculators, and hand-held, laptop/notebook, mini, mainframe and super computers, telephony systems (e.g., sound, video, data, etc.), message paging systems, portal devices and the like, as well as network combinations of the same.

Conventional processing system architecture is more fully discussed in *Computer Organization and Architecture*, by William Stallings, MacMillan Publishing Co. (3rd ed. 1993); conventional processing system network design is more fully discussed in *Data Network Design*, by Darren L. Spohn, McGraw-Hill, Inc. (1993); and conventional data communications is more fully discussed in *Data Communications Principles*, by R. D. Gitlin, J. F. Hayes and S. B. Weinstein, Plenum Press (1992) and in *The Irwin Handbook of Telecommunications*, by James Harry Green, Irwin Professional Publishing (2nd ed. 1992). Each of the foregoing publications is incorporated herein by reference.

Figure 3:
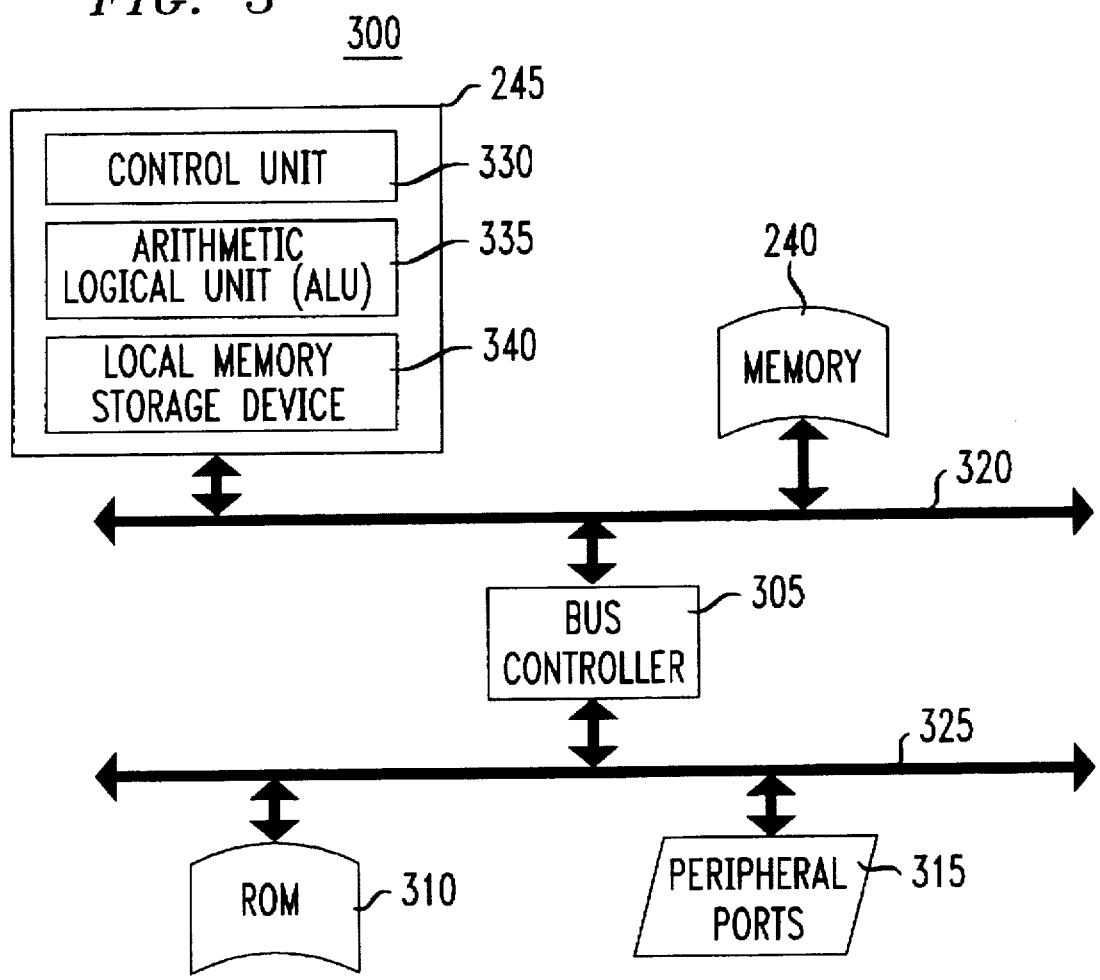
FIG. 3 illustrates a high-level block diagram of an exemplary microprocessing circuit that may suitably be associated with the processing system of FIG. 1 and that provides a suitable environment within which the present invention may be implemented and operated.

Turning to FIG. 3, illustrated is a high-level block diagram of an exemplary microprocessing circuit (generally designated 300) that may suitably be associated with a processing system, such as PC 200 of FIG. 2. Microprocessing circuit 300 includes detached local memory 240, processing circuitry 245, bus controller circuitry 305, a conventional read-only memory ("ROM") 310 and a set of peripheral ports 315. A host bus 320 is shown and is suitably operative to associate processing circuitry 245, detached local memory 240 and bus controller circuitry 305. In accordance with the illustrated embodiment, detached local memory 240 may suitably include random access memory ("RAM"), and processing circuitry 245 may suitably include one or more processors acting in concert.

An input/output ("I/O") bus 325 is shown and is operative to associate bus controller circuitry 305, ROM 310 and the set of peripheral ports 315. The set of peripheral ports 315 may suitably couple I/O bus 325 to peripheral devices 210, 215, 255, and 260 of FIG. 2 for communication therewith. Included among the set of peripheral ports 315 may suitably be a serial or a parallel port. Bus controller circuitry 305 provides suitable means by which host bus 320 and I/O bus 325 may be associated, thereby providing a path and management for communication therebetween. In accordance with the illustrated embodiment, host bus 320 is relatively fast to facilitate rapid communication between processing circuitry 245 and detached local memory 240 and is typically burdened with as few components as possible to maximize its speed. I/O bus 325 is allowed to run at a slower pace with respect to host bus 320 because its speed is less critical. Each of the lines of the buses 320, 325 require a drive current to carry signals thereon. Accordingly, the present invention operates in conjunction with a conventional system controller (not shown) that supplies the required drive current. Of course, the present invention may also suitably function within an architecture that only has a single bus.

In alternate preferred embodiments, microprocessing circuit 300, in whole or in part, may be replaced by, or combined with, any other suitable processing circuitry, including programmable logic devices, such as programmable array logic ("PALs") and programmable logic arrays ("PLAs"), digital signal processors ("DSPs"), field programmable gate arrays ("FPGAs"), application specific integrated circuits ("ASICs"), very large scale integrated circuits ("VLSIs") or the like, to form the various types of circuitry described and claimed herein.

Figure 4:
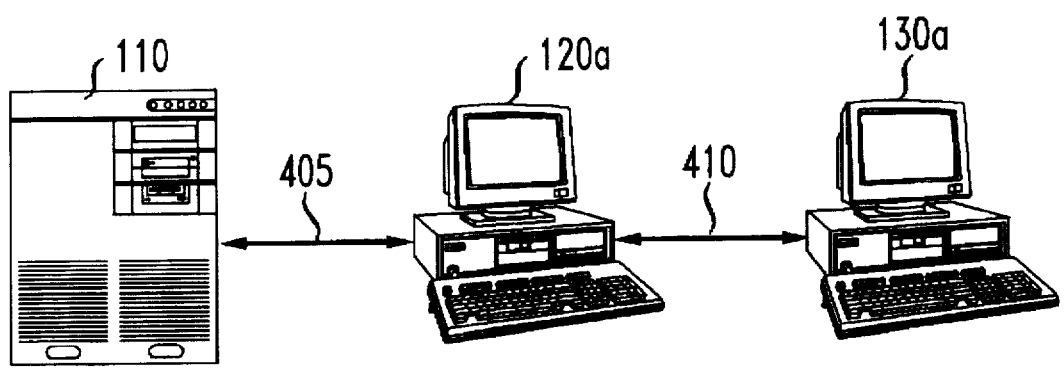
FIG. 4 illustrates a high-level block diagram of a single exemplary branch of the communications network of FIG. 1.

Turning momentarily to FIG. 4, illustrated is a high-level block diagram of a single exemplary branch (generally designated 400), or a collapsed hierarchy, of communications network 100 of FIG. 1. Exemplary server 110 and client nodes 120a and 130a form a hierarchical communications path wherein the illustrated nodes are suitably associated via conventional communication links 405 and 410, respectively. FIG. 4 is presented for the purposes of illustration in connection with the discussion of FIG. 5 only. Although the illustrated embodiment focuses upon a tree-based hierarchical network, those of ordinary skill in the art will realize that the principles of the present invention are applicable in any suitably arranged communications networking environment (e.g., peer-to-peer networks, etc.). The present invention provides a means by which revisions to information associated with one or more first level nodes may suitably be communicated to one or more second level nodes, from at least one of the one or more second level nodes to one or more third nodes, from at least one of the one or more third level nodes to one or more fourth nodes, etc. The present invention therefore facilitates the propagation of revisions through a communications network at an exponential rate.

Figure 5:
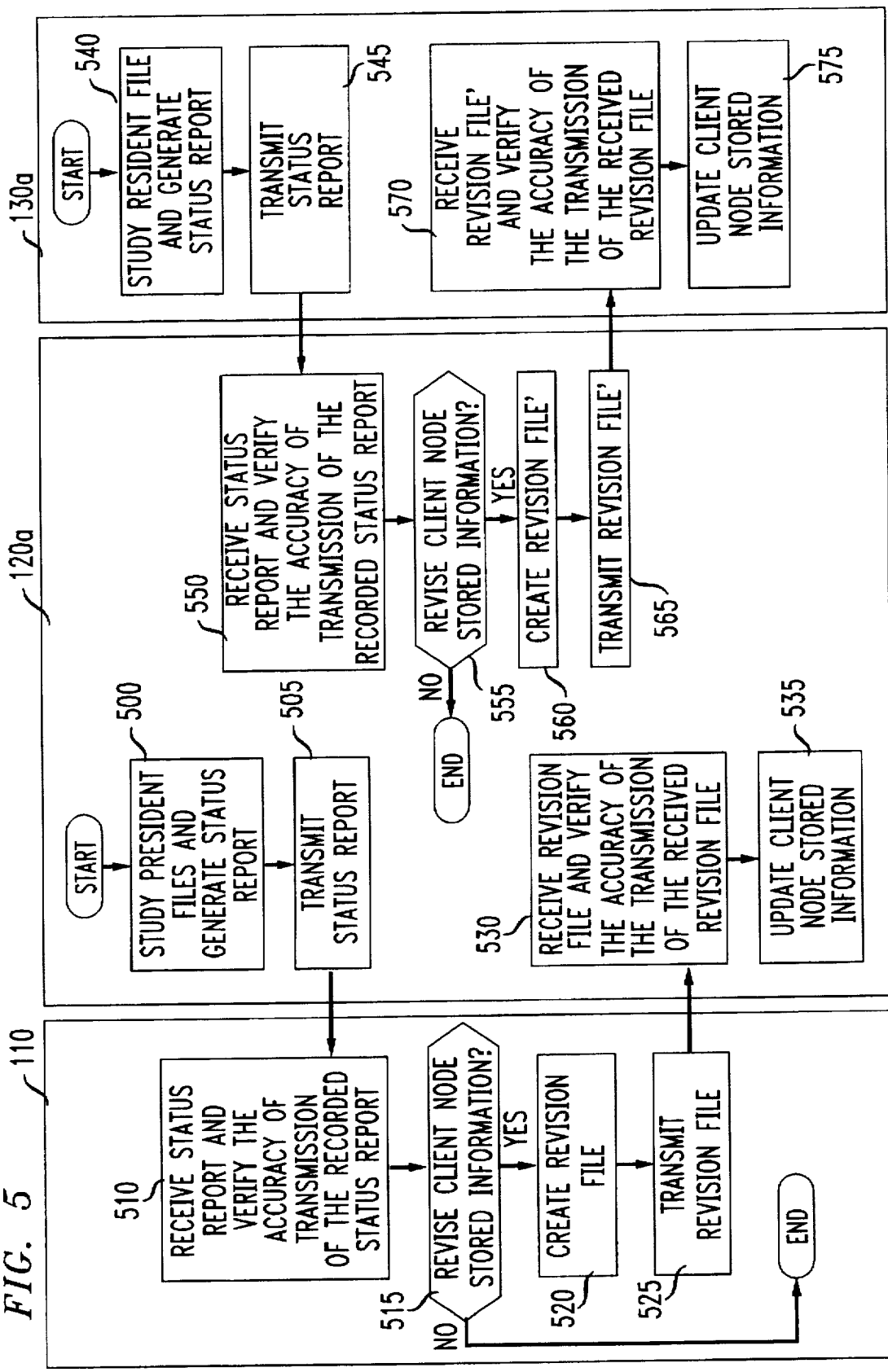
FIG. 5 illustrates a flow diagram of an exemplary method of operation for propagating revisions through the communications network of FIG. 1 in accordance with the principles of the present invention.

Turning to FIG. 5, illustrated is a flow diagram of an exemplary method of operation of communications network 100 for propagating revisions through branch 400 of FIG. 4, and more particularly, server 110 and client nodes 120a and 130a, in accordance with the present invention. The present discussion is undertaken with reference to FIG. 4, and it is assumed that each of exemplary nodes 110, 120a and 130a includes a suitable processing means, such as microprocessing circuit 300 of FIG. 3 or other suitable implementation capable of providing equivalent functionality. An exemplary source code embodiment is attached hereto as APPENDIX A and is incorporated herein by reference for all purposes. The exemplary embodiment is written in conventional Korn Shell code for use with a UNIX environment, System V Release 4 ("SVR4").

For purposes of discussion, it is further assumed that server node 110 receives revisions to information stored in a memory associated therewith. The revisions may suitably be received from any of a number of sources, including software providers/vendors, for example.

The illustrative process begins when client node 120a scans its associated memory studying the information stored thereon (e.g., files, database, data configurations, programs, routines, subroutines, functions, tasks, and the like) and generates a status report (process step 500). The status report represents the current status of client node 120a information, and may suitably include an identifier to identify various client node information, a version number associated with various client node information, a revision date associated with various client node information, or the like. The scanning process may suitably be initiated externally by server node 110 or internally by client node 120a. In either situation, the initiation may suitably be performed periodically or aperiodically.

Client node 120a, possibly using one of peripheral ports 315, transmits the status report to server node 110 (input/ output step 505). Server node 110, possibly using one of its peripheral ports 315, receives the transmitted status report and suitably verifies the accuracy of the transmission (process step 510). Techniques for verifying the transmission of data are known.

In an advantageous embodiment, server node 110 is further operative to authenticate the current status of client node 120a by logging onto client node 120a, and confirming the information within the received status report. "Authenticate," as the term is used herein, means to establish the authenticity of, prove genuine or the like, including confirm, corroborate, prove, substantiate, validate, verify, or the like. For example, if the received status report indicates that client node 120a includes version 1.0 of software package XYZ, server 110 may suitably log onto client node 120a to confirm that client node 120a in fact includes version 1.0 of software package XYZ. Often times, stored information, such as software package XYZ, includes a plurality of files. In a related embodiment therefore, server 110 authenticates the status report on a file-by-file basis.

Server node 110, if the status report was correctly received, determines as a function of the received status report whether a revision of client node 120a stored information is required (decisional step 515). In another advantageous embodiment, a suitable inventory is maintained, either directly or indirectly, by server node 110. The inventory includes a list of the information maintained, used, provided, or the like by server node 110, and possibly client node 120a. The determination of whether client node 120a stored information requires revision is suitably performed by comparing the status report with the inventory thereby identifying information that (1) is missing from client node 120a, (2) may suitably be removed from client node 120a, (3) is not a recent version, (4) is expired, such as under the terms of a license agreement, or the like. Conventional techniques for performing comparisons are known.

In connection with licensing arrangements, the above-referenced identification process may suitably be used to identify valid, invalid, out-of-date or the like subscriber information maintained by client node 120a, an aspect of the present invention that is discussed in greater detail hereinbelow.

If client node 120a stored information requires revision (YES branch of decisional block 515), server node 110 suitably creates an information revision file for transmission to client node 120a (process step 520). An exemplary information revision file may suitably include programs, functions, tasks, subroutines, procedures, documents, spreadsheets, databases, data files, data configurations, or the like. The revision file may also suitably include a set of instructions for execution by client node 120a, the executed set of instructions may suitably direct client node 120a to install the remainder of the information revision file, perform transmission verifications, security or the like.

Server node 110, possibly using one of peripheral ports 315, suitably transmits the revision file to client node 120a (input/output step 525). Client node 120a, again possibly using one of its peripheral ports 315, receives the transmitted revisions file and verifies the accuracy of the transmission (process step 530). If the transmission was correctly received, the stored information on client node 120a is updated using the received revision file (process step 535).

The foregoing update may suitably be performed in any one of a number of ways, for example, server node 110 may suitably update client node 120a stored information by logging onto client node 120a and one of:

(a) perform the update in a conventional "master-slave"-type environment (i.e., communications session in which one side, called the master, initiates and controls the session, and the other side, called the slave, responds to the master's commands), and (b) transmit a sequence of commands to client node 120a that, upon execution by client node 120a, enable client node 120a to perform the update.

In another example, client node 120a receives the revision file from server 110, buffers the received revision file, and suitably performs the update. Client node 120a may also receive the above-identified set of instructions as part of the revision file, the set of instructions, when suitably executed by client node 120a, direct client node 120a to install the remainder of the buffered revision file, or alternatively, to perform transmission verifications, security or the like.

In accordance with the illustrated embodiment, client node 120a, a second level client in network branch 400, may suitably function as a temporary "server" to client node 130a, a third level client in network branch 400.

The illustrative process continues when client node 130a scans its associated memory studying the information stored thereon (e.g., files, database, data configurations, programs, routines, subroutines, functions, tasks, and the like) and generates a status report (process step 540). The status report represents the current status of client node 130a information, and may suitably include an identifier to identify various client node information, a version number associated with various client node information, a revision date associated with various client node information, or the like. The scanning process may suitably be initiated externally by client node 120a or internally by client node 130a. In either situation, the initiation may again suitably be performed periodically or aperiodically.

Client node 130a, possibly using one of peripheral ports 315, transmits the status report to client node 120a (input/output step 545). Client node 120a, possibly using one of its peripheral ports 315, receives the transmitted status report and suitably verifies the accuracy of the transmission (process step 550).

In an advantageous embodiment, client node 120a is further operative to authenticate the current status of client node 130a by logging onto client node 130a, and confirming the information within the received status report. In a related embodiment, the authentication of the status report, portions of which may again include a plurality of files, is performed on a file-by-file basis.

Client node 120a, if the status report was correctly received, determines as a function of the received status report whether a revision of client node 130a stored information is required (decisional step 555). In yet another advantageous embodiment, a suitable inventory is maintained, either directly or indirectly, by client node 120a. The inventory includes a list of the information maintained, used, provided, or the like by client node 120a, and possibly client node 130a or server node 110. The determination of whether client node 130a stored information requires revision is suitably performed by comparing the status report with the inventory thereby identifying information that (1) is missing from client node 130a, (2) may suitably be removed from client node 130a, (3) is not a recent version, (4) is expired, such as under the terms of a license agreement, or the like.

In connection with licensing arrangements, the above-referenced identification process may suitably be used to identify valid, invalid, out-of-date or the like subscriber information maintained by client node 130a, an aspect of the present invention that is discussed in greater detail hereinbelow.

If client node 130a stored information requires revision (YES branch of decisional block 555), client node 120a suitably creates an information revision file for transmission to client node 130a (process step 560). The information revision file may suitably include, at least in part, the revision file received by client node 120a from server node 110.

An exemplary information revision file may suitably include programs, functions, tasks, subroutines, procedures, documents, spreadsheets, databases, data files, data configurations, or the like. The revision file may also suitably include a set of instructions for execution by client node 130a, the executed set of instructions may suitably direct client node 130a to install the remainder of the information revision file, perform transmission verifications, security or the like.

Client node 120a, possibly using one of peripheral ports 315, suitably transmits the revision file to client node 130a (input/output step 565). Client node 130a, again possibly using one of its peripheral ports 315, receives the transmitted revisions file and verifies the accuracy of the transmission (process step 570). If the transmission was correctly received, the stored information on client node 130a is updated using the received revision file (process step 575).

The foregoing update may suitably be performed in any one of a number of ways, for example, client node 120a may suitably update client node 130a stored information by logging onto client node 130a and one of:

(a) perform the update in a conventional "master-slave"-type environment (i.e., communications session in which one side, called the master, initiates and controls the session, and the other side, called the slave, responds to the master's commands), and (b) transmit a sequence of commands to client node 130a that, upon execution by client node 130a, enable client node 130a to perform the update.

In another example, client node 130a receives the revision file from client node 120a, buffers the received revision file, and suitably performs the update. Client node 130a may also receive the above-identified set of instructions as part of the revision file, the set of instructions, when suitably executed by client node 130a, direct client node 130a to install the remainder of the buffered revision file, or alternatively, to perform transmission verifications, security or the like.

The above-identified and -described process may suitably be performed in a conventional network environment and may further suitably be transparent to the underlying network operating system ("NOS"). This feature enable conventional security and other features of the NOS to remain intact.

An important aspect of various embodiments of the present invention, is that either client node 120a or 130a may suitably include a sequence of instructions for performing at least a portion of the above-described update process which itself is subject to an update by the received information revision file. The sequence of instructions may suitably be revised by the received revision file, and then suitably executed, thereby allowing one or more operations of one of client node 120a or 130a to be modified and allowed to change or be updated over time.

Another important aspect of the present invention as exemplified by the illustrated embodiment, is that client node 130a stored information may suitably be revised, at least in part, by the revision file received by client node 120a from server node 110. The revision thereby propagates through the communications network via the first, second and third nodes thereof.

In a related embodiment, the status report generated by client node 120a may be transmitted from client node 120a to server node 110 at a first time, whereas the status report generated by client node 130a may then be transmitted from client node 130a to client node 120a at a second time. The second time may advantageously be subsequent to the first time by a period of time sufficient to allow client node 120a information to be fully revised before client node 120a transmits the revision to client node 130a. A further aspect of the present invention therefore is allowance of orderly "waves" of revisions to propagate through communications network 100. In alternate embodiments, revisions may suitably be distributed in a more random fashion, as one node determines that another node requires a revision.

An advantageous application of the present invention is to subscriber-based software distribution systems. "Subscriber-based systems," as the phrase is used herein, means electronic communications systems wherein a party, the "subscriber," contracts with a vendor, distributor, licensor or the like to receive and pay for a certain number of issues, versions, or the like of a particular software package, group of software packages, electronic services, or the like. More particularly, at least one of server node 110 or client node 120a includes memory for storing a subscriber list, associating subscribers with their subscribed to services. Server node 110 and client node 120a transmit revision files, at least in part, as a function of the content of the subscriber list. The present invention therefore may suitably form the core of a fee-based update service, wherein subscribers pay for revisions. The amount of information revised and the frequency of the revisions may be selectable, allowing a range of fee-based services to be offered. In a related embodiment, the subscriber list is associated with a restricted list. The restricted list, when suitably processed in association with the subscriber list, identifies a subset of the information of the subscriber list that is available or unavailable to a particular user or group of users, such as a group of users associated by geographical location, for example. The restricted list may therefore functions as a filter for the subscriber list.

The propagation of updates through a subscriber-based systems may be particularly advantageous, not only over WANs, such as the Internet, but also through cable television systems, such as those providing pay-per-view and demand-television, including emerging services for receiving video games and other interactive services.

From the above, it is apparent that the present invention provides a system, and method of operation, for propagating revisions through a communications network, wherein the communications network includes a plurality of associated nodes. The system includes: (1) status reporting circuitry, associated with a second node of the communications network, for collecting and transmitting a current status of second node information stored in a memory of the second node, (2) first information revising circuitry, associated with a first node of the communications network, for receiving the current status from the second node, determining as a function of the current status whether a revision of the second node information is required and, if the revision is required, transmitting the revision to the second node to revise the second node information and (3) second information revising circuitry, associated with the second node of the communications network, for receiving a current status from a third node of the communications network, determining as a function of the current status from the third node whether a revision of third node information stored in a memory of the third node is required and, if the revision is required, transmitting the revision received from the first node to the third node to revise the third node information, the revision thereby propagating through the communications network via the first, second and third nodes thereof. Revisions are therefore allowed to propagate automatically through a communications network, wherein various nodes within the communications network are responsible for both detecting when a revision to information in another node is necessary and transmitting the revision to the other node.

The broad scope of the present invention is not limited to tree-based hierarchical networks of the type set forth in FIGS. 1, 4 and 5, but also includes other conventional networks configurations, such as peer-to-peer communications networks. The propagation of revisions is also not limited to a first node to a second node to a third node progression, but rather includes revision of a first node propagated to one or more second nodes, from at least one of the one or more second nodes to one or more third nodes, from at least one of the one or more third nodes to one or more fourth nodes, etc., thereby enabling not only the sequential revision of serially associated nodes, but also a hierarchical fan-out updating of a plurality of nodes.

The present invention is also not limited to pure "computer-based" communications networks, such as LANs or WANs, but may also suitably be implemented in telecommunication systems to update system software or data or in wireless environments, such as cellular telephony or message paging networks. To that end, the principles of the present invention may suitably be associated with any network element functioning as a node, including routers, bridges, gateways, switches, or other conventional portal devices, satellites, relay stations, or the like. While the principles of the present invention have been described in detail, those skilled in the art should understand that they can make various changes, substitutions and alterations herein without departing from the spirit and scope of the invention in its broadest form.

APPENDIX A

"SENDLIST" SOURCE CODE

```
        CMD=`basename $0`
        USAGE="Usage: $CMD [ -d ] [ -s serverID ]"

5       KSHOK=no
        echo yes | read KSHOK
        if test "$KSHOK" = "no"; then
            if test "${RETRYING_KSH:-no}" = "yes"; then
                echo "$CMD: ERROR: not running with ksh88 -- aborting!"
10              echo "$CMD: ERROR: not running with ksh88 -- aborting!" |
                    /bin/mail exptools
                RC=2
            elif test $# -gt 0; then
                RETRYING_KSH="yes" $SHELL $0 "$@"
15              RC=$?
            else
                RETRYING_KSH="yes" $SHELL $0
                RC=$?
            fi
20          exit $RC
        fi

# ------------------------------ < emsg
        #
        # This routine prints out error messages and mails them to exptools 25      emsg() {
            typeset MSG="$CMD: ERROR: $1 -- aborting!"
            typeset LOG=$ADMRUG/$SERVERID/local/sendplist.out
            typeset ECODE ECMD if test -n "$2"; then
30              echo $2 | read ECMD ECODE
                MSG="$MSG\nError '$ECODE' reported by '$ECMD'"
            fi echo "$MSG" >&2
            {
35              echo "Subject: sendplist error!"
                echo
                echo "$MSG"
                if test -s $LOG; then
                    echo "\nHere is the complete sendplist log file:"
40                  echo "----------------------------------------"
                    pr -o4 -t $LOG
                    echo "----------------------------------------"
                fi
            } | /bin/mail exptools
45      }

# ------------------------------ < extractsection
        #
        # This routine extracts given sections of input files that are terminated by
```

```
                # the EOF line.

extractsection() {
                    integer section=$1
                    typeset inputfile=$2
5                   integer i=1
                    typeset LINE done=false while not $done && read LINE; do
                        if ((i > section)); then
                            done=true
10                      elif test "$LINE" = "$EOF"; then
                            ((i += 1))
                        elif ((i == section)); then
                            echo "$LINE"
                        fi
15                  done < $inputfile
                }

------------------------------ < main

GETOPT=$(getopt ds: "$@")
                if (($? != 0)); then
20                  echo "$USAGE"
                    exit 2
                fi set -- $GETOPT set -e                          # Exit on any error 25              debug=""
                SERVERID=""
                for arg in "$@"; do
                    case "$arg" in
                    -s)
30                      SERVERID=$2
                        shift 2
                        ;;
                    -d)
                        debug=:
35                      shift
                        ;;
                    --)
                        shift
                        break
40                      ;;
                    esac
                done if test ! -f $ADMRUG/global/config; then
                    emsg "Can't find RUG global config file"
45                  exit 2
                fi . $ADMRUG/global/config if test -n "$SERVERID"; then
                    FOUND=false
```

-28-

```
            for ID in $SERVERIDLIST; do
                    if test "$ID" = "$SERVERID"; then
                        FOUND=true
                    fi
 5          done
            if not $FOUND; then
                    emsg "Unknown serverid '$SERVERID' given"
                    exit 2
            fi
10      else
            if test -z "$DEFAULTSERVERID"; then
                    emsg "Default server id missing"
                    exit 2
            fi
15          SERVERID=$DEFAULTSERVERID
        fi exec > $ADMRUG/$SERVERID/local/sendplist.out 2>&1 echo "Start `date`\n"

CASCADEFILE=$ADMRUG/$SERVERID/global/cascade
20      if test -f $CASCADEFILE; then
            cp $CASCADEFILE $ADMRUG/local/cascadefile
            chmod 664 $ADMRUG/local/cascadefile
        fi . $ADMRUG/global/linkconfig $SERVERID 25      NETINFO=$(echo $SERVERID $TYPE | $NETCMD)
        if test -z "$NETINFO"; then
            emsg "Unable to acquire network information"
            exit 2
        fi 30      echo "Networking information: $NETINFO"

tmppkglist=/usr/tmp/$$pkglist
        tmpplist=/usr/tmp/$$plist
        tmpexclude=/usr/tmp/$$exclude
        tmpignore=/usr/tmp/$$ignore
35      mkperrs=/usr/tmp/$$mkperrs
        errfile=/usr/tmp/$$errfile
        tmpsubfile=/usr/tmp/$$subfile
        tmpflist="$tmppkglist $tmpplist $tmpexclude $tmpignore $mkperrs $errfile $tmpsubfile"

retval=0
40      trap '
            retval=1
            exit
        ' 1 2 3 15
        trap '
45          rm -f $tmpflist
            exit $retval
        ' EXIT cd rm -f adm/upd1.1/lib/cpio.new         # Remove emergency update list 50      echo "\nComputing the subscription list ..."
```

-29-

```
        {
        echo "The $LOGNAME userid uses the alias '$LOCALCLIENTID' to subscribe to the
        following $TYPE tools from '$SERVERID':"
          cat $SUBSCRLIST |                    # Combine *all* subscr-list files
  5       CleanComm |
          sed '/^!/d' |
          sort -f > $tmpsubfile
          if test -s $tmpsubfile; then
              pr -o4 -t -4 $tmpsubfile
 10       else
              echo "NONE!"
          fi
          cat $SUBSCRLIST |                    # Combine *all* subscr-list files
          CleanComm |
 15       sed '/^[^!]/d; s/^!//' |
          sort -f > $tmpsubfile
          if test -s $tmpsubfile; then
              echo " rejecting these tools:"
              pr -o4 -t -4 $tmpsubfile
 20       fi
        } > $ADMRUG/local/subscrlist
        chmod 664 $ADMRUG/local/subscrlist echo "\nComputing checksums..."

(
 25         > $errfile
            > $mkperrs
            {
                cat $EXCLUDELIST                # Combine *all* exclude-list files
                genlinkdirs $SERVERID
 30         } | mksed >> $tmpignore
            { find . ! -name '.' -print       || echo "find $?" > $errfile ;} |
            { sed -e 's!^\./!!' -f $tmpignore  || echo "sed $?" > $errfile ;} |
            { $ADMRUG/bin/mkplist -m 2 > $mkperrs ||
                                                echo "mkplist $?" > $errfile ;} |
 35         { sort -u                          || echo "sort $?" > $errfile ;}
            if test -s $errfile; then
                if test -s $mkperrs; then
                    cat $mkperrs >> $ADMRUG/$SERVERID/local/sendplist.out
                fi
 40             emsg "Failure preparing client plist report" "$(< $errfile)"
                exit 2
            else
                echo "$EOF"
            fi
 45     ) > $tmpplist
        chmod 664 $tmpplist eval ${debug:+"cp $tmpplist $ADMRUG/$SERVERID"} if (($(TZ=GMT date +%H) < 2)); then    # if before 2AM GMT
            integer WAITTIME=RANDOM%1800       # set 1/2 hour random delay
 50         echo "\nWaiting $WAITTIME seconds to prevent server overload"
            sleep $WAITTIME
        fi echo "\nSending to $SERVERID"

echo "$NETINFO" |
 55     $debug $SENDCMD -u $SERVERID_LOGNAME -f rje/$SERVERID/$LOCALCLIENTID.$YRDAY $tmpplist
```

-30-

```
        (
        > $errfile
        cat $SUBSCRLIST |                    # Combine *all* subscr-list files
        CleanComm |
5       sort -u
        echo "$EOF"
        (
              cat $EXCLUDELIST               # Combine *all* exclude-list files
              genlinkdirs $SERVERID
10      ) |
        CleanComm |
        sort -u
        echo "$EOF"
        if test -z "$DEFAULTLOCALID"; then
15            echo "0:$LOCALCLIENTID:$(uname -n):$LOGNAME:$(uname -rvm)"
        else
              typeset LINKDIR=$ADMRUG/$DEFAULTLOCALID
              typeset RJE=$HOME/rje/$DEFAULTLOCALID
              echo "0:$LOCALCLIENTID/$DEFAULTLOCALID:$(uname -n):$LOGNAME:$(uname -rvm)"
20            if test -f $LINKDIR/server/exptab; then
                  sort $LINKDIR/server/exptab
              fi |
              while IFS=: read CLIENT REST; do
                  if test -f $RJE/$CLIENT.pkg; then
25                      integer COUNT=0
                        extractsection 3 $RJE/$CLIENT.pkg |
                        while IFS=: read COUNT CT ND UID OS; do
                            ((COUNT += 1))
                            echo "$COUNT:$CT:$ND:$UID:$OS"
30                      done
                  fi
              done
        fi
        echo "$EOF"
35      ) > $tmppkglist
        chmod 664 $tmppkglist eval ${debug: + "cp $tmppkglist $ADMRUG/$SERVERID"} echo "$NETINFO" |
        $debug $SENDCMD -u $SERVERID_LOGNAME -f rje/$SERVERID/$LOCALCLIENTID.pkg $tmppkglist 40      if [ -s $mkperrs ]; then
        (
              echo "Subject: mkplist errors on $LOCALCLIENTID\n"
              sed "s/^/$LOCALCLIENTID:sendplist:$TYPE:/" $mkperrs
        ) |
45      /bin/mail $SERVERMAIL

# Log the error messages
        echo "Errors:"
        cat $mkperrs
        fi 50      rm -f /tmp/sh$$.1 echo "\nFinish `date`"
```

-31-

"SENDUPDT" SOURCE CODE

```
        CMD=`basename $0`
        USAGE="Usage: $CMD [ -cdprR ] [ -l localID ] [ -t threshold ] client"

KSHOK=no
 5      echo yes | read KSHOK
        if test "$KSHOK" = "no"; then
           if test "${RETRYING_KSH:-no}" = "yes"; then
                   echo "$CMD: ERROR: Not running with ksh88 -- aborting!"
                   RC=2
10         elif test $# -gt 0; then
                   RETRYING_KSH="yes" $SHELL $0 "$@"
                   RC=$?
           else
                   RETRYING_KSH="yes" $SHELL $0
15                 RC=$?
           fi
           exit $RC
        fi alias -x echo="print -"

20      # ---------------------------- < emsg
        #
        # This routine prints out error messages and mails them to exptools emsg() {
           typeset MSG="$CMD: ERROR: $1 -- aborting!"
25         typeset LOG=$outfile
           typeset ECODE ECMD if test -n "$2"; then
                   echo $2 | read ECMD ECODE
                   MSG="$MSG\nError '$ECODE' reported by '$ECMD'"
30         fi echo "$MSG" >&2
           {
                   echo "Subject: sendupdates error!"
                   echo
35                 echo "$MSG"
                   if test -s $LOG; then
                           echo "\nHere is the end of the sendupdate log file:"
                           echo "------------------------------------------------"
                           tail $LOG | pr -o4 -t
40                         echo "------------------------------------------------"
                   fi
           } | /bin/mail exptools
        }

# ---------------------------- < findclient
45      #
        # This routine returns a list of machines of the type defined by the first arg findclient() {
```

-32-

```
        machines type==$1 | sort
    }

# ------------------------< cleanupclient
    #
5   # This routine removes old rjc files for a designated client.

cleanupclient() {
        typeset CLIENTID=$1 today=$2
        typeset rmpattern todayfile yr=`date '+%y'`
10      lastyr=`expr $yr - 1`
        ${debug} rm -f $RJE/$CLIENTID.${lastyr}* $RJE/$CLIENTID.diff*
        rmpattern="$RJE/$CLIENTID.${yr}*"
        todayfile="$RJE/$CLIENTID.$today"
        for x in $rmpattern; do
15          if test "$x" != "$todayfile" -a "$x" != "$rmpattern"; then
                ${debug} rm $x
            fi
        done
    }

20  # -------------------------< deletefiles
    #
    # This command deletes files from a client deletefiles() {
        $debug delfile -v -p $EXPPKGID -c -P $EXPPWD -M $SERVERMAIL "$@" name==$CLIENTID
25  }

# -------------------------< deletedirs
    #
    # This command deletes directories from a client deletedirs() {
        $debug rrmdir -v -p $EXPPKGID -c -P $EXPPWD $altuid -M $SERVERMAIL "$@" name==$CLIENTID
30  }

# -------------------------< senddelfiles
    #
    # This routine sends the commands to delete files from a client 35  senddelfiles() {
        typeset CLIENTID=$1 diffile=$2
        typeset pattern='`^- \(.*[^/]\)$`'     # ordinary (non-dir) file pattern if (( $(grep -c "$pattern" $diffile) > 0 )); then
            echo "\tRemove files:"
40          sed -n "s!$pattern!       \1!p" $diffile
            sed -n "s!$pattern!rm \1!p" $diffile |
            {
                # Do the standard setup
                echo 'HOME=`expr "$0" : "\(.*\)/adm/bin/"`'
45              echo '. $HOME/.cronprofile'
                # Now get the user commands
                cat
```

```
            } > $tmpcmdfile
            rex -cv -p $EXPPKGID -r priv -P $EXPPWD $altuid -M $SERVERMAIL -f $tmpcmdfile name==$CLIENTID
      fi
   }

5  # ------------------------------ < sendchmods
   #
   # This routine sends chmod commands to a client sendchmods() {
      typeset CLIENTID=$1 diffile=$2
10    typeset pattern='^\([0-9]*\) \(.*\)$'   # chmods file pattern if (( $(grep -c "$pattern" $diffile) > 0 )); then
         echo "\tChange files:"
         sed -n "s!$pattern!          \1      \2!p" $diffile
         sed -n "s!$pattern!chmod \1 \2'!p" $diffile |
15       {
            # Do the standard setup
            echo 'HOME=`expr "$0" : "\(.*\)/adm/bin/'"`"
            echo '. $HOME/.cronprofile'
            # Now get the user commands
20          cat
         } > $tmpcmdfile
         rex -cv -p $EXPPKGID -r priv -P $EXPPWD $altuid -M $SERVERMAIL -f $tmpcmdfile name==$CLIENTID
      fi
   }

25 # ------------------------------ < sendrmdirs
   # sendrmdirs() {
      typeset CLIENTID=$1 diffile=$2
      typeset pattern='^- \(.*\)/$'           # directory pattern 30    if (( $(grep -c "$pattern" $diffile) > 0 )); then
         echo "\tRemove directory:"
         sed -n "s!$pattern!          \1!p" $diffile
         sed -n "s!$pattern!-d'\1'!p" $diffile |
         sort -r |
35       xargs -s350 echo deletedirs |   # echo the function we want
         eval "$(cat)"                   # exec constructed function
      fi
   }

# ------------------------------ < sendrepfiles
40 # sendrepfiles() {
      typeset CLIENTID=$1 diffile=$2
      integer onemeg=1048576   # number of bytes in a one meg file
      integer bsize            # number of bytes in a block on this machine
45    integer limit            # maximum size of cpio file in blocks
      typeset CPIOFLAGS        # flags for cpio case $(machtype)
      in  ibm)    bsize=4096   # ibm uses 4096-byte blocks
      ;;  pyr)    bsize=2048   # pyr uses 2048-byte blocks
```

-34-

```
            ;;  *)        bsize=512 # everyone else uses 512-byte blocks
            esac ((limit = onemeg / bsize))  # calculate the block size limit of files
            sed -n "s!+ \(.*[^/]\)/*\S!'\1'!p" $diffile > $tmpclist
5           if [ -s "$tmpclist" ]; then
                    integer sum=0 size
                    echo "\tUpdate files:"
                    sed 's/^/                            /' $tmpclist
                    > $tmpwlist
10                  xargs ls -sd < $tmpclist |
                    {
                       CPIOFLAGS='-oc'
                       if test "$TYP" = "mip"; then
                           CPIO=expcpio
15                     else
                           CPIO=cpio
                           if $SVR4; then
                               CPIOFLAGS="-o -Hodc"
                           fi
20                     fi
                       while read -r size filename; do
                           ((sum = sum + size))
                           if [[ $sum -gt $limit && -s $tmpwlist ]]; then
                               $CPIO $CPIOFLAGS < $tmpwlist > $tmpcpio
                               $debug sendcpio -v -p $EXPPKGID -c -P $EXPPWD $altuid -M $SERVERMAIL -f $tmpcpio
25          name==$CLIENTID
                               ((sum = size))
                               > $tmpwlist
                           fi
                           echo "$filename" >> $tmpwlist
30                     done
                       $CPIO $CPIOFLAGS < $tmpwlist > $tmpcpio
                       $debug sendcpio -v -p $EXPPKGID -c -P $EXPPWD $altuid -M $SERVERMAIL -f $tmpcpio name==$CLIENTID
                    }
35          fi
            }

# -------------------------< dirlog
            #
40          dirlog() {
                typeset CLIENTID=$1 diffile=$2 sed -n "/\/$/s%\(.*\).%`date +%y%m%d` \1%p" $diffile >> $LINKDIR/client/$CLIENTID/dirlog
            }

# -------------------------< updlog
            #
45          updlog() {
                typeset CLIENTID=$1 diffile=$2 sed -n "/\/$/!s%^%`date +%y%m%d` %p" $diffile >> $LINKDIR/client/$CLIENTID/updlog
            }

# -------------------------< plistOK
50          #
```

-35-

```
        plistOK() {
           typeset plistfile=$1
           typeset RC if test ! -f "$plistfile"; then
5                 RC=1
           elif test "$(tail -1 $plistfile 2>/dev/null)" != "$EOF"; then
                  RC=1
           else
                  RC=0
10         fi return $RC
        }

# -----------------------------< pkgfileOK
        #

15      pkgfileOK() {
           typeset pkgfile=$1
           typeset RC if test ! -f "$pkgfile"; then
                  RC=1
20         elif test "$(tail -1 $pkgfile 2>/dev/null)" != "$EOF"; then
                  RC=1
           else
                  RC=0
           fi 25         return $RC
        }

# -----------------------------< mktoollist
        #
        # This routine returns a full list of the tools subscribed to in the file
30      # given as argument.

mktoollist() {
           typeset RC

> $errfile2                              # begin with no error condition
           > $tmpsubscr2                            # begin with no tool list initially
35         for subfile; do eliminate comments and blank lines
                  { CleanComm < $subfile || echo "CleanComm $?" > $errfile2 ;} |
                  # get excluded tool names
                  { sed '/^[^!]*/d; s/^!//' || echo "sed $?" > $errfile2 ;} |
40                # expand any metanames
                  { expandtools || echo "expandtools $?" > $errfile2 ;} |
                  # sort the list
                  { sort -u > $tmpexclude || echo "sort $?" > $errfile2 ;} if test -s $errfile2; then break; fi   # Break out of loop on error

45                # move previous tool list
                  { mv $tmpsubscr2 $tmpsubscr1 || echo "mv $?" > $errfile2 ;}
```

```
          if test -s $errfile2; then break; fi      # Break out of loop on error eliminate comments and blank lines
                    { CleanComm < $subfile || echo "CleanComm $?" > $errfile2 ;} |
                    # get subscribed tool names
                    { sed '/^!/d' || echo "sed $?" > $errfile2 ;} |
                    # expand any metanames
                    { expandtools || echo "expandtools $?" > $errfile2 ;} |
                    # add previous tools and sort them
                    { sort -u - $tmpsubscr1 || echo "sort $?" > $errfile2 ;} |
                    # remove the excluded names
                    { comm -23 - $tmpexclude > $tmpsubscr2 || echo "comm $?" > $errfile2 ;} if test -s $errfile2; then break; fi      # Break out of loop on error
          done if test -s $errfile2; then
                    read ECMD ECODE < $errfile2
                    echo "$0: Error '$ECODE' reported by '$ECMD'" >&2
                    RC=$ECODE
          else
                    cat $tmpsubscr2                  # return the final list
                    RC=0
          fi return $RC
     }

# ------------------------------< extractsection
     #
     # This routine extracts given sections of input files that are terminated by
     # the EOF line.

extractsection() {
          integer section=$1
          typeset inputfile=$2
          integer i=1
          typeset LINE done=false while not $done && read LINE; do
               if ((i > section)); then
                    done=true
               elif test "$LINE" = "$EOF"; then
                    ((i += 1))
               elif ((i == section)); then
                    echo "$LINE"
               fi
          done < $inputfile
     }

------------------------------< mailnews mailnews() {
          typeset NEWSTIME=$HOME/.mailnews_time NEWSDIR=$ADMRUG/news if test -d $NEWSDIR -a -n "$*"; then
               cd $NEWSDIR
               for file in $(ls -tr); do
                    if test $file -nt $NEWSTIME; then
```

-37-

```
                echo "\tAnnouncement 'Sfile' mailed to $*"
                {
                    echo "Subject: Exptools announcement"
                    echo
                    cat $file
                } | /bin/mail $*
            fi
        done
        cd -
    fi
    touch $NEWSTIME
}

------------------------------ < salutation salutation() {
    if not $SALUTATION; then
        SALUTATION=true
        echo "\n========================================================================================================"
        echo "---> To the Exptools Administrator of server $LOCALID:"
    fi
}

# ------------------------------ < clientsort

# This routine sorts clients based on the depth and number of machine in the
# cascade they serve. This allows clients who have deeper and more numerous
# cascades to get their tools first and begin serving them sooner.

clientsort() {
    typeset CL
    integer DEPTH MAXDEPTH MACHCOUNT WEIGHT
    for CL; do
        typeset PKGFILE=$HOME/rje/$LOCALID/$CL.pkg
        MAXDEPTH=0 MACHCOUNT=0 WEIGHT=0
        if test -f $PKGFILE; then
            extractsection 3 $PKGFILE |
            while IFS=: read DEPTH REST; do
                if ((MAXDEPTH < DEPTH)); then
                    ((MAXDEPTH = DEPTH))
                fi
                if ((DEPTH == 1)); then
                    ((MACHCOUNT += 1))
                fi
            done
            ((WEIGHT = MAXDEPTH + MACHCOUNT/4))
        fi
        echo "$WEIGHT $CL"
    done |
    sort +0 -1nr +1 |
    while read DEPTH CL; do
        echo "$CL"
    done
}

------------------------------ < main

```

```
        autoload take cd

GETOPT=$(getopt cdprRt:l: "$@")
        if (($? != 0)); then
 5          echo "$USAGE"
            exit 2
        fi set -- $GETOPT debug=""
10      LOCALID=""
        RESEND=false
        CHECKSUMS=false
        USEPLIST=false
        NULL_MEANS_ALL=true
15      : ${THRESHOLD:=200}
        for arg in "$@"; do
            case "$arg" in
            -c)
                CHECKSUMS=true
20              shift
                ;;
            -d)
                debug=echo
                shift
25              ;;
            -r)
                RESEND=true
                NULL_MEANS_ALL=false
                shift
30              ;;
            -R)
                RESEND=true
                shift
                ;;
35          -p)
                USEPLIST=true
                shift
                ;;
            -t)
40              THRESHOLD=$2
                shift 2
                ;;
            -l)
                LOCALID=$2
45              shift 2
                ;;
            --)
                shift
                break
50              ;;
            esac
        done

CLIENTLIST="$@"

if test ! -f $ADMRUG/global/config; then
55          echo "$CMD: ERROR: Can't find RUG global config file"
```

```
            exit 2
        fi

. $ADMRUG/global/config if test -n "$LOCALID"; then
            FOUND=false
 5          for ID in $DEFAULTLOCALID $LOCALIDLIST; do
                if test "$ID" = "$LOCALID"; then
                    FOUND=true
                fi
10          done
            if not $FOUND; then
                echo "SCMD: ERROR: Unknown local server ID '$LOCALID' given -- aborting!"
                exit 2
            fi
15      else
            if test -z "$DEFAULTLOCALID"; then
                echo "SCMD: ERROR: Default local server ID missing -- aborting!"
                exit 2
            fi
20          LOCALID=$DEFAULTLOCALID
        fi . $ADMRUG/global/linkconfig $LOCALID outfile=$LINKDIR/server/update.out
        if test $(find $outfile -mtime +1 -print | wc -l) -ne 0; then
25          SENDUPDATES_DORMANT=true          # Sendupdates has been asleep!
        else
            SENDUPDATES_DORMANT=false         # Sendupdates running as usual
        fi
        $debug eval "exec > $outfile 2>&1"
30      echo "Start `date` \n"

EXPTAB=$LINKDIR/server/exptab                     export EXPTAB
        EXPPKGID=$LOCALID
        RJE=$HOME/rje/$LOCALID
        NEWFILES=$HOME/adm/upd1.1/lib/cpio.new
35      NEWFILESCOPY=$HOME/adm/upd1.1/lib/cpio.new2

: ${tmp:=/usr/tmp}
        tmpCignore=$tmp/$$Cignore          # List of files to ignore from Client
        tmpSignore=$tmp/$$Signore # List of files to ignore from Server
        tmpignfile=$tmp/$$ignfile    # Work file of files to ignore
40      tmpdiff=$tmp/$$pdiff               # List of files to change on client
        tmpclist=$tmp/$$clist              # List of files to cpio to client
        tmpplist=$tmp/$$plist              # Sorted, uncommented client plist
        tmpwlist=$tmp/$$wlist              # List of files lt size limit to cpio
        tmpcpio=$tmp/$$cpio                # Cpio file to send to client
45      tmpexclude=$tmp/$$excl             # Work list of excluded tools
        tmpsubscr1=$tmp/$$sub1             # Work list of subscribed tools
        tmpsubscr2=$tmp/$$sub2             # Work list of subscribed tools
        tmpCNTmodel=$tmp/$$Cmodel          # Names of files desired by client
        tmpCNTplist=$tmp/$$Cplist # Client plist with excluded files removed
50      tmpSRVtools=$tmp/$$Stools # List of tools offered
        tmpSRVplist=$tmp/$$Splist # Plist of files offered to client
        tmppkgfile=$tmp/$$pkgfile  # Work file of packages client subscribes to
        tmpfiles=$tmp/$$files              # Work file of file names
        tmpcmdfile=$tmp/$$cmds             # Work file for commands to be sent
55      errfile=$tmp/$$errfile             # Flag file for detecting errors in pipes
```

-40-

```
        errfile2=$tmp/$$errfile          # Flag file for detecting errors in pipes
        tmpflist="$tmpCignore $tmpSignore $tmpignfile $tmpdiff $tmpclist $tmppList $tmpwlist $tmpcpio $tmpexclude $tmpCNTmodel
        $tmpCNTplist $tmpSRVtools $tmpSRVplist $tmppkgfile $tmpfiles $tmpcmdfile $tmpsubscr1 $tmpsubscr2 $errfile $errfile2"
        retval=0
5       trap '
          retval=1
          exit
        '
        trap '
10        trap - ERR
          emsg "Error code $retval detected"
          exit $retval
        ' ERR
        trap '
15        $debug rm -f $tmpflist
          {
                echo "Subject: $LOCALID gateway runlog\n"
                cat $outfile
          } |
20        $debug /bin/mail $ADMIN_EMAIL
          exit $retval
        ' EXIT if $SENDUPDATES_DORMANT; then
          echo "*********************************************"
25        echo "WARNING: Sendupdates has not been run for over 48 hours!\a"
          echo "*********************************************"
        fi SRVplist=$LINKDIR/server/plist.$YRDAY
        SRVflist=$LINKDIR/server/flist
30      for file in $LINKDIR/server/plist.*; do
          if [ "$file" != "$SRVplist" ]; then
                rm -f $file
          fi
        done 35      if test -z "$CLIENTLIST" && $NULL_MEANS_ALL; then
          CLIENTLIST=`findclient $TYPE`
        fi echo "Clients:
        $CLIENTLIST"

40      if $RESEND; then
          for CLIENTID in $CLIENTLIST; do
                CLIENTID=$(take 8 $CLIENTID)
                EXPPWD=$LINKDIR/client/$CLIENTID/.pwd
                if test -s $LINKDIR/client/$CLIENTID/uidname; then
45                altuid="-u$(< $LINKDIR/client/$CLIENTID/uidname)"
                else
                  altuid=
                fi
                tmpdiff=$RJE/$CLIENTID.diff
50              SUSPENDED=$LINKDIR/client/$CLIENTID/Suspended
                if test ! -f $tmpdiff; then
                  echo "\n---> No diff file found for $CLIENTID\a"
                elif test -f $SUSPENDED && $NULL_MEANS_ALL; then
                  echo "\n---> Client $CLIENTID currently suspended"
55              else
```

-41-

```
            cc=`wc -l < $tmpdiff`
            if [ "$cc" -eq 0 ]; then
                echo "\n\tNo updates for $CLIENTID"
            else
                echo "\n\tChanges for $CLIENTID: " $cc
                senddelfiles $CLIENTID $tmpdiff
                sendrmdirs   $CLIENTID $tmpdiff
                sendchmods   $CLIENTID $tmpdiff
                sendrepfiles $CLIENTID $tmpdiff
                dirlog       $CLIENTID $tmpdiff
                updlog       $CLIENTID $tmpdiff
            fi
        fi
    done
elif $USEPLIST || $CHECKSUMS || not plistOK $SRVplist; then
    {
        cat $EXCLUDELIST
        genlinkdirs $LOCALID
    } | mksed -w > $tmpSignore
    if $USEPLIST; then
        echo "\nAccepting current checksums ..."
    else
        echo "\nCreating upward cascade map"
        UPDLOG=$TOOLS/adm/upd1.1/lib/updlog
        CPIOLOG=$TOOLS/adm/upd1.1/lib/cpio.log
        TZ=$OLD_TZ date | read X X X X TIMEZONE REST
        MONTH="DATE"
        DAY="UNKNOWN!"
        TIME=""
        if test -f $CPIOLOG -a ! -f $ADMRUG/.over; then
            TZ=$OLD_TZ ls -l $CPIOLOG | read X X X X X MONTH DAY TIME REST
            TIME="$TIME $TIMEZONE"
        elif test -f $UPDLOG; then
            TZ=$OLD_TZ ls -l $UPDLOG | read X X X X X MONTH DAY TIME REST
            TIME="$TIME $TIMEZONE"
        fi
        integer LEVEL
        CASCADEFILE=$LINKDIR/global/cascade
        echo "1:$LOCALID:$MONTH $DAY $TIME" > $CASCADEFILE
        for ID in $DEFAULTSERVERID $SERVERIDLIST; do
            if test -f $ADMRUG/$ID/global/cascade; then
                while IFS=: read LEVEL SERVER TIMESTAMP; do
                    ((LEVEL += 1))
                    echo "$LEVEL:$SERVER:$TIMESTAMP"
                done < $ADMRUG/$ID/global/cascade >> $CASCADEFILE
            fi
        done
        chmod 664 $CASCADEFILE
        cat $CASCADEFILE echo "\nCreating downward cascade map"
        {
            echo "\nNOTE: This cascade map generated $(date)"
            showtree -l $LOCALID
        } > $LINKDIR/local/cascade echo "\nChecking on exptools announcements"
        {
            LOCAL_ADMIN_EMAIL=$ADMIN_EMAIL
            if test -n "$DEFAULTSERVERID"; then
                . $ADMRUG/global/linkconfig $DEFAULTSERVERID
```

```
                    SERVER_ADMIN_EMAIL=$ADMIN_EMAIL
                else
                    SERVER_ADMIN_EMAIL=""
                fi
                if test "$LOCAL_ADMIN_EMAIL" != "$SERVER_ADMIN_EMAIL"; then
                    mailnews $LOCAL_ADMIN_EMAIL
                fi
            )

echo "\nCalculating new checksums ..."
            rm -f $RJE/UpdateStarted $RJE/UpdateEnded $RJE/RequestEnded $errfile
            {
                mktoollist $SUBSCRLIST   || echo "mktoollist $?" > $errfile
            } > $tmpSRVtools if test -s $errfile; then
                emsg "Failure preparing server tool list" "$(< $errfile)"
                rm -f $tmpSRVtools
                exit 2
            fi if test ! -s $tmpSRVtools; then
                echo "$CMD: ERROR: No tools being served by this server -- aborting!"
                exit 2
            fi if not fgrep -x updtools $tmpSRVtools > /dev/null 2>&1; then
                echo "$CMD: ERROR: Essential tool 'updtools' not being served -- aborting!"
                exit 2
            fi {
                # Get filenames for tools served
                { TOOLS=$HOME $TOOLS/adm/upd1.1/bin/prpkg -it < $tmpSRVtools ||
                                            echo "prpkg $?" > $errfile ;} |
                # Put in sorted order
                { sort -u                   || echo "sort $?" > $errfile ;} |
                # Add directories to complete list
                { $TADMRUG/bin/dirfillout   || echo "dirfillout $?" > $errfile ;} |
                # Remove server-ignored files
                { sed -f $tmpSignore        || echo "sed $?" > $errfile ;} |
                # Get plist data for given files
                { time $TADMRUG/bin/mkplist -m || echo "mkplist $?" > $errfile ;} |
                # Put in sorted order
                { sort -u                   || echo "sort $?" > $errfile ;}
                echo "$EOF"
            } > $SRVplist if test -s $errfile; then
                emsg "Failure preparing server checksums" "$(< $errfile)"
                exit 2
            fi
        fi
        if not plistOK $SRVplist; then
            echo "$CMD: ERROR: Corrupted plist file '$SRVplist' -- aborting!"
            exit 2
        fi
        rm -f $NEWFILES                     # Remove previous list of new files
        if not $USEPLIST; then
            > $RJE/UpdateStarted
        fi
```

```
        OVERTHRESHOLD=false
        LONGTERMPROB=false
        MISSINGREPORT=false
        SUBSCRIBE_ERROR=false
        echo "\nCurrent update threshold: $THRESHOLD"
        echo "\nThe clients below are processed according to the sizes of their cascades."
        echo "largest first."
        for CLIENTID in $(clientsort $CLIENTLIST); do
                CLIENTID=$(take 8 $CLIENTID)
                cleanupclient $CLIENTID $YRDAY
                SUSPENDED=$LINKDIR/client/$CLIENTID/Suspended
                if test -f $SUSPENDED; then
                        echo "\n---> Client $CLIENTID currently suspended"
                else
                        EXPPWD=$LINKDIR/client/$CLIENTID/.pwd
                        if test -s $LINKDIR/client/$CLIENTID/uidname; then
                                altuid="-u$(< $LINKDIR/client/$CLIENTID/uidname)"
                        else
                                altuid=
                        fi
                        CNTplist=$RJE/$CLIENTID.$YRDAY
                        CNTpkgfile=$RJE/$CLIENTID.pkg
                        if not plistOK $CNTplist; then
                                if test ! -f $CNTplist; then
                                        MISSINGREPORT=true
                                        echo "\n---> No plist file found for $CLIENTID\a"
                                integer DAYSOLD=0
                                if test ! -f $CNTpkgfile; then
                                        echo "    No package file found for $CLIENTID"
                                elif not $SENDUPDATES_DORMANT && test -z "$(find $CNTpkgfile -mtime -3 -print 2>/dev/null)"; then
                                        DAYSOLD=4
                                        while test -n "$(find $CNTpkgfile -mtime +$DAYSOLD -print 2>/dev/null)"; do
                                                ((DAYSOLD += 1))
                                        done
                                        ((DAYSOLD -= 1))
                                        echo "    This client hasn't reported for $DAYSOLD days!"
                                fi
                                if ((DAYSOLD != 0)); then
                                        ADMINDATA=$LINKDIR/client/$CLIENTID/admindata
                                        if test -f $ADMINDATA; then
                                                typeset NAME EMAIL
                                                while read FIELD VALUE; do
                                                        case "$FIELD"
                                                        in  NAME)        NAME="$VALUE"
                                                        ;;  EMAIL)       EMAIL="$VALUE"
                                                        esac
                                                done < $ADMINDATA
                                                if [[ "$EMAIL" != @(none|NONE|"") ]]; then
                                                {
                                                        echo "Subject: exptools errors"
                                                        echo
                                                        if [[ "$NAME" != @(none|NONE|"") ]]; then
                                                                echo "To $NAME:"
                                                                echo
                                                        fi
                                                        echo "The RUG update code has detected an error. Your client '$CLIENTID' has not"
                                                        echo "reported to its server '$LOCALID' for the last $DAYSOLD days. Please check"
                                                        echo "your system to see what is causing this problem. Consult the 'rugadm' HELP"
                                                        echo "subsystem for advice. The 'rugcheck' command may also be helpful"
                                                        echo "in identifying the cause of this problem."
                                                        echo
```

-44-

```
                        echo "\t\t\t\t$LOCALID Exptools update routine"
                    } | mail $EMAIL
                    echo "   Warning notice sent to $EMAIL."
                else
                    echo "   No administrator email address on file for '$CLIENTID'."
                    echo "   Warning notice NOT SENT to that machine's Exptools administrator."
                fi
            fi
            if ((DAYSOLD%5 == 0)); then
            {
                    echo "Subject: exptools client trouble"
                    echo
                    echo "The RUG update code has detected an error. The client '$CLIENTID' has not"
                    echo "reported to its server '$LOCALID' for the last $DAYSOLD days. Please contact"
                    echo "the exptools administrator of that system to see what might be causing this"
                    echo "problem. You can consult the 'rugadm' HELP subsystem for advice."

echo
                    echo "\t\t\t\t$LOCALID Exptools update routine"
            } | mail $ADMIN_EMAIL
                    echo "   Warning notice sent to $ADMIN_EMAIL."
            fi
        fi
    else
        echo "\n---> Corrupted plist file found for $CLIENTID\a"
    fi
elif not pkgfileOK $CNTpkgfile; then
    if test ! -f $CNTpkgfile; then
        MISSINGREPORT=true
        echo "\n---> No package file found for $CLIENTID\a"
    else
        echo "\n---> Corrupted package file found for $CLIENTID\a"
    fi
else
    echo "\nProcessing $CLIENTID `date`"
    sleep 10    # Allow other processes to be cleaned up
    > $errfile
    if test ! -f $tmpSRVtools; then
    {
        mktoollist $SUBSCRLIST      || echo "mktoollist $?" > $errfile
    } > $tmpSRVtools if test -s $errfile; then
            emsg "Failure preparing server tool list" "$(< $errfile)"
            rm -f $tmpSRVtools
            exit 2
    fi if test ! -s $tmpSRVtools; then
            echo "$CMD: ERROR: No tools being served by this server -- aborting!"
            exit 2
    fi
    if not fgrep -x updtools $tmpSRVtools > /dev/null 2>&1; then
            echo "$CMD: ERROR: Essential tool 'updtools' not being served -- aborting!"
            exit 2
    fi
    fi
    extractsection 1 $CNTpkgfile > $tmppkgfile
    extractsection 2 $CNTpkgfile |
    mksed > $tmpCignore
```

-45-

```
if test ! -s $tmppkgfile; then
    echo "$CMD: ERROR: No tools being requested by this client -- skipping!"
    SUBSCRIBE_ERROR=true
    continue
fi
if not fgrep -x updtools $tmppkgfile > /dev/null 2>&1; then
    echo "$CMD: ERROR: Essential tool 'updtools' not requested -- skipping!"
    SUBSCRIBE_ERROR=true
    continue
fi {
    # Get tools subscribed to
    { mktoollist $tmppkgfile || echo "mktoollist $?" > $errfile ;} |
    # Intersect with offered tools
    { comm -12 - $tmpSRVtools || echo "comm $?" > $errfile ;} |
    # Get filenames
    { TOOLS=$HOME $TOOLS/adm/upd1.1/bin/prpkg -ir ||
                                           echo "prpkg $?" > $errfile ;} |
    # Put in sorted order
    { sort -u              || echo "sort $?" > $errfile ;} |
    # Add missing dirs to list
    { $TADMRUG/bin/dirfillout || echo "dirfillout $?" > $errfile ;} |
    # Remove client-ignored files
    { sed -f $tmpCignore    || echo "sed $?" > $errfile ;} |
    # Put in plist form w/o csums
    { $TADMRUG/bin/mkplist -c || echo "mkplist $?" > $errfile ;} |
    # Put in sorted order
    { sort -u              || echo "sort $?" > $errfile ;} |
    { /usr/bin/join -j 1 -t'        ' - $SRVplist
                                        echo "join $?" > $errfile ;}
} > $tmpCNTmodel if test -s $errfile; then
    emsg "Failure analyzing client $CLIENTID checksums" "$(< $errfile)"
    continue
fi if test ! -s $tmpCNTmodel; then
    echo "$CMD: ERROR: No files being requested by this client -- skipping!"
    SUBSCRIBE_ERROR=true
    continue
fi CleanComm < $CNTplist |             # Clean out any comments
sort -u > $tmpplist |               # Make sure the file is sorted
cut -f1 $tmpplist |                 # Get the client filenames
sed -f $tmpSignore |                # Remove server-ignored files
/usr/bin/join -j 1 -t'        ' - $tmpplist > $tmpCNTplist $TADMRUG/bin/diffplist -m $tmpCNTmodel -s $tmpCNTplist > $tmpdiff
PROBFILE=$RJE/.prob.$CLIENTID
cc=`wc -l < $tmpdiff`
if fgrep -x -e "- profile" $tmpdiff > /dev/null 2>&1; then
    echo "$CMD: ERROR: Update requests for this client corrupted -- skipping!"
elif [ "$cc" -gt $THRESHOLD ]; then
    echo "\t----> Too many updates for $CLIENTID: $cc -- skipping\a"
    if test -f $PROBFILE; then
        if test -z "$(find $PROBFILE -mtime -3 -print 2> /dev/null)"; then
            integer DAYSOLD=4
```

-46-

```
                    while test -n "$(find $PROBFILE -mtime +$DAYSOLD -print 2>/dev/null)"; do
                            ((DAYSOLD += 1))
                    done
                    ((DAYSOLD -= 1))
                    if ((DAYSOLD > 7)); then
                            LONGTERMPROB=true
                            STARS="***"
                    else
                            STARS=""
                    fi
                    echo "\t   ${STARS}This client has been over threshold for $DAYSOLD days!"
                fi
            else
                    > $PROBFILE
                    OVERTHRESHOLD=true
            fi
        elif [ "$cc" -eq 0 ]; then
            rm -f $PROBFILE
            echo "\tNo updates for $CLIENTID"
        else
            rm -f $PROBFILE
            echo "\tChanges for $CLIENTID: " $cc
            senddelfiles $CLIENTID $tmpdiff
            sendrrmdirs  $CLIENTID $tmpdiff
            sendchmods   $CLIENTID $tmpdiff
            sendrepfiles $CLIENTID $tmpdiff
            dirlog       $CLIENTID $tmpdiff
            updlog       $CLIENTID $tmpdiff
        fi
        cp $tmpdiff $RJE/$CLIENTID.diff
    fi
 fi
done
SALUTATION=false
if $OVERTHRESHOLD; then
    salutation
    cat <<-!

*************************************************************
 Some systems have EXCEEDED the nightly update threshold. Systems with more
 than $THRESHOLD changes will not be updated except through the express approval
 of the exptools administrator. See the rugadm HELP screen "Approving the
 resending of update files to client machines" to see how to issue such an
 approval.
*************************************************************
    !
fi
if $LONGTERMPROB; then
    salutation
    cat <<-!

*************************************************************
 Some systems have been over threshold for 7 days or more! Please determine
 why these systems have not gotten their updates.
*************************************************************
    !
fi
if $MISSINGREPORT; then
    salutation
    cat <<-!
```

```
        ************************************************************
        Some clients did not send in their nightly reports in time to be included in
        today's update processing. See the rugadm HELP screen "Checking on client
        reports" for tips on how to handle this problem.
5       ************************************************************
                !
        fi
        if $SUBSCRIBE_ERROR; then
                salutation
10              cat < < -!

************************************************************
        Some clients have problems with their subscription lists. See the rugadm
        HELP screen "Understanding RUG ERROR messages" for tips on how to handle this
        problem.
15      ************************************************************
                !
        fi
        if not $USEPLIST; then
                > $RJE/UpdateEnded
20      fi
        elif test -s $NEWFILES; then
           echo "\nSending out newly arrived files ..."
           cp $NEWFILES $NEWFILESCOPY
           {
25              cat $EXCLUDELIST
                genlinkdirs $LOCALID
           } | mksed -w > $tmpSignore
           for CLIENTID in $CLIENTLIST; do
                EXPPWD=$LINKDIR/client/$CLIENTID/.pwd
30              if test -s $LINKDIR/client/$CLIENTID/uidname; then
                    altuid='-u$(< $LINKDIR/client/$CLIENTID/uidname)'
                else
                    altuid=
                fi
35              CNTpkgfile=$RJE/$CLIENTID.pkg
                if not pkgfileOK $CNTpkgfile; then
                    if test ! -f $CNTpkgfile; then
                        echo "\n---> No package file found for $CLIENTID\a"
                    else
40                      echo "\n---> Corrupted package file found for $CLIENTID\a"
                    fi
                else
                    echo "\nProcessing $CLIENTID `date`"
                    > $errfile
45                  if test ! -f $tmpSRVtools; then
                        {
                            mktoollist $SUBSCRLIST || echo "mktoollist $?" > $errfile
                        } > $tmpSRVtools
                    fi 50                  if test -s $errfile; then
                        emsg "Failure preparing server tool list" "$(< $errfile)"
                        rm -f $tmpSRVtools
                        exit 2
                    fi 55                  if test ! -s $tmpSRVtools; then
                        echo "$CMD: ERROR: No tools being served by this server -- aborting!"
                        exit 2
                    fi
```

-48-

```
                extractsection 1 $CNTpkgfile > $tmppkgfile
                extractsection 2 $CNTpkgfile |
                mksed > $tmpCignore                      # Client-ignored files, sedscr if test ! -s $tmppkgfile; then
  5                     echo "$CMD: ERROR: No tools being requested by this client -- skipping!"
                        continue
                fi sed -f $tmpCignore $NEWFILES |    # Remove client-ignored files
                TOOLS=$HOME $TOOLS/adm/upd1.1/bin/pkgpath -a |  # Get toolnames
 10             sort -u > $tmpCNTmodel            # Sort new tool:file list (
                    # Get tools subscribed to
                    { mktoollist $tmppkgfile || echo "mktoollist $?" > $errfile ;} |
                    # Intersect with offered tools
 15                 { comm -12 - $tmpSRVtools || echo "comm $?" > $errfile ;} |
                    # Put in sorted order
                    { sort -u              || echo "sort $?" > $errfile ;} |
                    # Join with new tool:file list
                    { /usr/bin/join -t: - $tmpCNTmodel |
 20                                             echo "join $?" > $errfile ;} |
                    # Extract the file names
                    { cut -d: -f2          || echo "cut $?" > $errfile ;} |
                    # Put in sorted order
                    { sort -u              || echo "sort $?" > $errfile ;} |
 25                 # Put in update form
                    { sed 's/.*/+ &/'      || echo "sed $?" > $errfile ;}
                ) > $tmpdiff if test -s $errfile; then
                        emsg "Failure analyzing client $CLIENTID checksums" "$(< $errfile)"
 30                     continue
                fi cc=`wc -l < $tmpdiff`
                if [ "$cc" -eq 0 ]; then
                        echo "\tNo updates for $CLIENTID"
 35             else
                        echo "\tChanges for $CLIENTID: " $cc
                        sendrepfiles $CLIENTID $tmpdiff
                        updlog    $CLIENTID $tmpdiff
                fi
 40             cp $tmpdiff $RJE/$CLIENTID.diff2
        fi
    done
    if cmp -s $NEWFILES $NEWFILESCOPY; then
            rm $NEWFILES $NEWFILESCOPY
 45     else
            comm -13 $NEWFILES $NEWFILESCOPY > $tmpfiles
            mv $tmpfiles $NEWFILES
            rm $NEWFILESCOPY
    fi
 50 else
        echo "\nNo reason to send files, none will be sent!"
    fi echo "\nFinish `date`"

$debug cat $outfile >> $LINKDIR/server/Runlog
```

-49-

What is claimed is:

1. A system for propagating revisions through a communications network, comprising:

status reporting circuitry, associated with a second node of said communications network, for collecting and transmitting a current status of second node information stored in a memory of said second node;

first information revising circuitry, associated with a first node of said communications network, for receiving said current status from said second node, determining whether a revision of said second node information is required based on said current status and, if said revision is required, transmitting said revision from said first node to said second node to revise said second node information; and second information revising circuitry, associated with said second node of said communications network, for receiving a current status from a third node of said communications network, determining whether a revision of third node information stored in a memory of said third node is required based on said current status from said third node and, if said revision of said third node information is required, transmitting said revision received from said first node to said third node to revise said third node information, said revision thereby propagating through said communications network via said first, second and third nodes thereof.

2. The system as recited in claim 1 wherein said second information revising circuitry includes a memory for storing a subscriber list, said second information revising circuitry transmitting said revision based on said subscriber list.

3. The system as recited in claim 1 wherein said status reporting circuitry collects and transmits said current status of said second node information to said first node at a first time, status information circuitry associated with said third node collecting and transmitting said current status from said third node to said second node at a second time, said second time subsequent to said first time by a period of time sufficient to allow said second node information to be fully revised before said second information revising circuitry transmits said revision to said third node.

4. The system as recited in claim 1 wherein said second information revising circuitry is embodied in a sequence of instructions operable on a second processor associated with said second node, said revision capable of including revisions to said sequence of instructions, thereby allowing an operation of said second information revising circuitry to be modified.

5. The system as recited in claim 1 wherein said communications network is hierarchical, said first node functioning as a server for said second node, said second node functioning as a server for said third node.

6. The system as recited in claim 1 wherein said first information revising circuitry includes first security circuitry for authenticating said current status received from said second node before said first node transmits said revision to said second node and said second node includes second security circuitry for authenticating said revision received from said first node before revising said second node information.

7. The system as recited in claim 1 wherein said first information revising circuitry revises said second node information by logging on to said second node and transmitting a sequence of commands to said second node to enable said second node to receive said revision.

8. A method of operation of a communications network for propagating revisions through said communications network, comprising the steps of:

collecting and transmitting a current status of second node information stored in a memory of a second node of said communications network;

receiving said current status from said second node into a first node of said communications network, said first node determining whether a revision of said second node information is required based on said current status and, if said revision is required, transmitting said revision from said first node to said second node to revise said second node information; and receiving a current status from a third node of said communications network into said second node, said second node determining whether a revision of third node information stored in a memory of said third node is required based on said current status from said third node and, if said revision of said third node information is required, transmitting said revision received from said first node to said third node to revise said third node information, said revision thereby propagating through said communications network via said first, second and third nodes thereof.

9. The method as recited in claim 8 wherein said step of receiving said current status from said third node comprises the step of transmitting said revision based on a subscriber list stored in said memory of said second node.

10. The method as recited in claim 8 wherein said current status of said second node information is collected and transmitted to said first node at a first time, said method further comprising the step of collecting and transmitting said current status from said third node to said second node at a second time, said second time subsequent to said first time by a period of time sufficient to allow said second node information to be fully revised before said second information revising circuitry transmits said revision to said third node.

11. The method as recited in claim 8 wherein said second node includes a sequence of instructions operable on a second processor associated with said second node, said revision capable of including revisions to said sequence of instructions, thereby allowing an operation of said second node to be modified.

12. The method as recited in claim 8 wherein said communications network is hierarchical, said first node functioning as a server for said second node, said second node functioning as a server for said third node.

13. The method as recited in claim 8 further comprising the steps of:

authenticating said current status received from said second node before said first node transmits said revision to said second node; and authenticating said revision received from said first node before revising said second node information.

14. The method as recited in claim 8 said step of receiving said current status from said second node into said first node comprises the step of revising said second node information by logging on to said second node and transmitting a sequence of commands to said second node to enable said second node to receive said revision.

15. A system for propagating revisions through a hierarchical communications network having a host, a first-level node and a second-level node, comprising:

status reporting circuitry, associated with said first-level node, for collecting and transmitting a current status of first-level node information stored in a memory of said first-level node at a first time;

first information revising circuitry, associated with said host, for receiving said current status from said first-level node, determining whether a revision of said first-level node information is required based on said current status and, if said revision is required, transmitting said revision from said host to said first-level node to revise said first-level node information; and second information revising circuitry, associated with said first-level node, for receiving a current status from said second-level node at a second time, determining whether a revision of second-level node information stored in a memory of said second-level node is required based on said current status from said second-level node and, if said revision of said second-level node information is required, transmitting said revision received from said host to said second-level node to revise said second-level node information, said second time subsequent to said first time by a period of time sufficient to allow said first-level node information to be fully revised before said second information revising circuitry transmits said revision to said second-level node, said revision thereby propagating through said communications network via said host, first-level and second-level nodes thereof.

16. The system as recited in claim 15 wherein said second information revising circuitry includes a memory for storing a subscriber list, said second information revising circuitry transmitting said revision based on said subscriber list.

17. The system as recited in claim 15 wherein said second information revising circuitry is embodied in a sequence of instructions operable on a second processor associated with said first-level node, said revision capable of including revisions to said sequence of instructions, thereby allowing an operation of said second information revising circuitry to be modified.

18. The system as recited in claim 15 wherein said first information revising circuitry includes first security circuitry for authenticating said current status received from said first-level node before said host transmits said revision to said first-level node and said first-level node includes second security circuitry for authenticating said revision received from said host before revising said first-level node information.

19. The system as recited in claim 15 wherein said second security circuitry authenticates said revision on a file-by-file basis.

20. The system as recited in claim 15 wherein said first information revising circuitry revises said first-level node information by logging on to said first-level node and transmitting a sequence of commands to said first-level node to enable said first-level node to receive said revision.

21. A system for propagating revisions through a communications network, said communications network including at least one first level node, at least one second level node and at least one third level node, said system comprising:

status reporting circuitry, associated with said at least one second level node, operative to collect and transmit a second level current status of information stored in a memory of said at least one second level node;

first information revising circuitry, associated with said at least one first level node, operative to: (1) receive said second level current status of information from said at least one second level node, (2) determine whether a revision of said at least one second level node information is required based on said second level current status of information, and (3) selectively transmit, in response to said determination, said revision of said at least one second level node information from said at least one first level node to said at least one second level node to revise said at least one second level node information; and second information revising circuitry, associated with said at least one second level node, operative to: (1) receive a third level current status of information from said at least one third level node, (2) determine whether a revision of said at least one third level node information stored in a memory of said at least one third level node is required based on said third level current status, and (3) selectively transmit, in response to said determination, said revision received from said at least one first level node to said at least one third level node to revise said at least one third level node information, said revision thereby propagating through said communications network via said at least one first level, at least one second level and at least one third level nodes thereof.

* * * * *